Dec. 15, 1953   J. E. LUNDBERG ET AL   2,662,411
ELECTRICAL PICK-OFF FOR GYROSCOPES
Filed May 16, 1950                    2 Sheets-Sheet 1
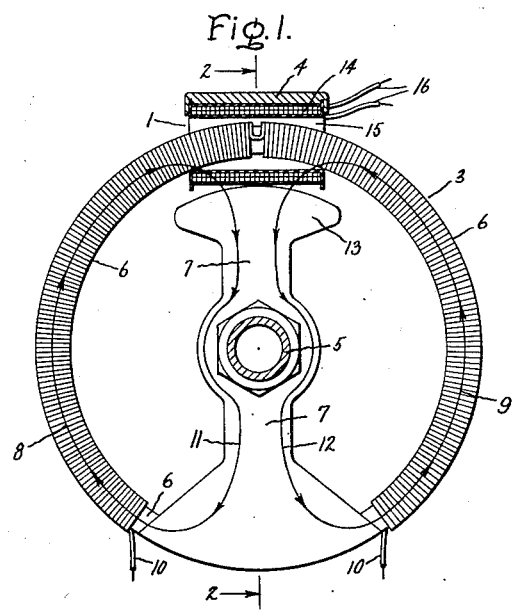
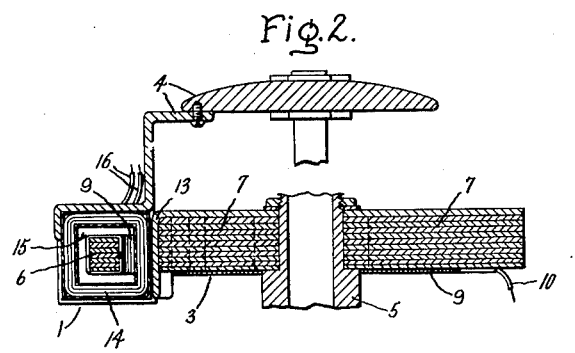
Inventors:
John E. Lundberg,
George A. Wallace,
by Russell A. Warner
Their Attorney.

Dec. 15, 1953   J. E. LUNDBERG ET AL   2,662,411
ELECTRICAL PICK-OFF FOR GYROSCOPES
Filed May 16, 1950                                   2 Sheets-Sheet 2
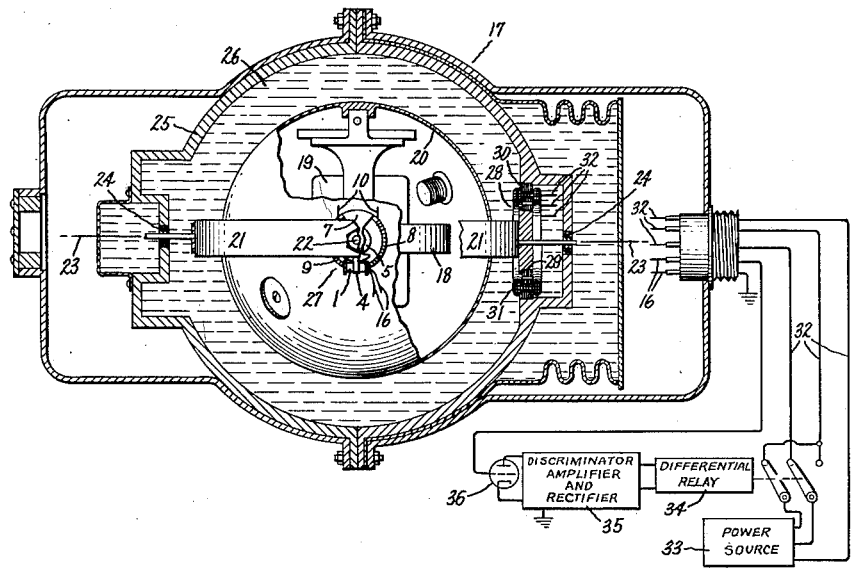
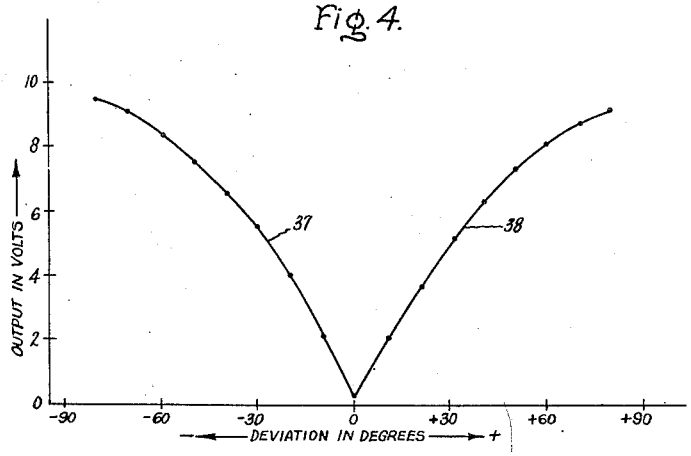
Inventors:
John E. Lundberg,
George A. Wallace,
by Russell A. Warner
Their Attorney.

UNITED STATES PATENT OFFICE 2,662,411

ELECTRICAL PICK-OFF FOR GYROSCOPES

John E. Lundberg, Swampscott, and George A. Wallace, Malden, Mass., assignors to General Electric Company, a corporation of New York Application May 16, 1950, Serial No. 162,257

7 Claims. (Cl. 74—5.47)

The present invention relates to improved control initiator devices and, more particularly, to improved gyroscope pick-offs for producing output signals characterizing the angular displacement between relatively rotatable gyroscope members.

It is well appreciated by those acquainted with the gyroscope art that high accuracy gyro instruments must operate with a minimum of normal inter-gimbal torque, else such torque as appears between any of these gimbals will result in precession and orientation of the rotor spin axis with erroneous attitudes. Yet it is frequently an accompanying requisite of such instruments that they cooperate with associated control initiator or pick-off devices which detect the relative angular orientations of such gimbals and deliver electrical output signals characteristic thereof to control apparatus for re-orienting the spin axis or actuating other devices. These requisites are incompatible when pick-offs of the types heretofore known are utilized, since the forces which must be overcome to angularly displace the relatively movable pick-off members are of magnitudes which would create intolerable precession of those gyroscopes designed for extremely high and long-period accuracy of indication.

Accordingly, it is one object of the present invention to provide a control system wherein negligible torque is required to displace relatively movable members of the control initiator device thereof.

A second object is to provide a pick-off device wherein magnetic drag torque between relatively movable members is substantially eliminated.

Further, it is an object to provide a high-accuracy low-torque gyro pick-off which produces characteristic control initiating signals responsive to minute deviations of relatively rotatable members thereof from a predetermined orientation.

These and further objects and features of this invention may be most effectively observed with reference to the following description and the accompanying drawings, wherein:

Figure 1 is a partially cut away pictorial view of one embodiment of a pick-off constructed in accord with the subject invention:

Figure 2 is a view in section of the device of Figure 1 taken along section line 2—2 thereof:

Figure 3 is a pictorial view cut away along a longitudinal axis, of a floated gyroscope incorporating a low torque pick-off and associated with block-diagrammed control equipment; and Figure 4 is a plot of the signal output versus angular displacement of a device such as that of Figures 1 and 2.

The pick-off of Figures 1 and 2 is illustrated as comprising a search coil 1 and a flux generating arrangement 3 which are supported by the relatively rotatable members 4 and 5 respectively. The flux generating arrangement includes a magnetic lamination stack which has a substantially annular configuration over a portion 6 and a center leg 7 which extends diametrically to within a short distance of the center of this annular portion. Serially-connected oppositely-wound windings 8 and 9 are disposed about the annular portion 6 of the lamination stack such that they each occupy approximately one-half of this annular portion, with their junction at the center opposite the open end of leg 7. Alternating current excitation of these windings via the supply leads 10 produces instantaneous flux flow which, during one-half cycle, may be directed as depicted by the flux lines 11 and 12, the reverse direction being followed during half cycles of opposite polarity. Open end 13 of the lamination stack center leg 7 is preferably of a curvature corresponding to that of the annular portion and, additionally, is of an angular width sufficient to provide a distributed low-reluctance flux path over a predetermined sector of the annular portion, whereby efficient transfer of energy to the search coil 1 is accomplished.

As these figures illustrate, the search coil 1 is of a substantially hollow-cylindrical configuration, the windings 14 thereof being supported by entirely non-magnetic materials, and the structure being disposed such that the lamination stack annular portion is free to pass through the central aperture 15. The search coil winding intercepts a maximum of flux when disposed symmetrically with the center leg diameter, as shown, but the net output voltage appearing between the search coil output leads 16 is zero for this position due to the fact that the oppositely-wound windings 8 and 9 have their junction at the center thereof and the fluxes flowing through the air gap between center leg 7 and core 6 thus induce substantially equal and opposite-phase voltages in the halves of the search coil winding. Upon relative rotation between the supporting members 4 and 5, the search coil 1 becomes angularly displaced from the null position illustrated, and a greater voltage is induced therein by one of the windings 8 and 9 than by the other, and a net output voltage of one or the opposite polarity appears across the output leads 16, depending upon the direction of this angular displacement. Since the search coil is supported by a non-magnetic member 4 and contains no core or coil forms of magnetic material, there is no magnetic drag experienced between the relatively rotatable structures.

Particularly advantageous operation of the foregoing pick-off arrangement is realized in its embodiment in a control system such as that represented in Figure 3. The floated type gyro instrument 17 thereof is as disclosed in the co-pending application of F. V. Johnson and F. R. Fowler, Serial No. 171,582, filed July 1, 1950, for "Floated Gyroscopes," assigned to the same assignee as that of the present application. This instrument includes a gyro rotor 18 and a motive means therefor, 19, mounted within a spherical shell or container 20 which is liquid-tight and which is pivotally supported by a main gimbal 21 through trunnions 22. Universal freedom of movement of sphere 20 is permitted by virtue of this pivoting about trunnions 22 and by virtue of the main gimbal 21 about the major axis 23—23 on bearings 24. The entire structure as thus far described is housed and mounted within the partially-spherical liquid-type enclosure 25. That volume intermediate the outer enclosure and those elements internal thereto is completely filled with a liquid 26 which buoys the spherical container 20, the dimensions of the container and the properties of the liquid being such that the container just displaces a volume of liquid equivalent to its mass, and the load on the trunnions is reduced to such a minute value that sensitive low friction bearings may be employed to substantially eliminate precession due to these friction sources. A pick-off 27 for initiating control of the precessing system, when the gyro is utilized as a directional reference, for example, and must be leveled, is illustrated about the minor axis. For purposes of simplifying the description, the components thereof bear the same numeral designations as those components of the pick-off of Figures 1 and 2. As explained hereinbefore, the torque required to angularly displace the sphere 20, which supports the lamination stack and windings 8 and 9, and the gimbal 21, which supports the search coil 1, is not influenced by magnetic drag between the pick-off components, and an output voltage characteristic of such angular displacements is produced.

Levelling of the rotor spin axis about the minor axis of trunnion 22 is accomplished by the application of torque about the major axis 23—23 by a torque motor 28. Although this torque motor may be of any convenient construction, the embodiment illustrated is of the hysteresis type, having a lamination stack portion 29 affixed to the gimbal 21 and a second lamination stack 30 and three phase windings 31 supported by the outer gimbal or container 25. By reversing two of the three phase winding connections 32, carrying excitation from the power source 33, the angular direction of rotation of the hysteresis motor rotating field, and hence, the angular direction of the levelling torque, may be changed. Differential relay 34 serves to switch the torque motor phase excitation to accomplish the required reversal of torque or de-energizing of the torque motor. Actuation of the differential relay to energize the torque motor in either direction is produced by the discriminator-amplifier and rectifier 35. However, the discriminator-amplifier control signal input from the pick-off output signal leads 16 is applied to the high impedance grid-cathode circuit of an input tube 36, the output voltage of this first stage thereafter being utilized to actuate the conventional discriminator branches which draw sizeable input current. With this system, the pick-off signal outputs control the gyro levelling, and yet the current flowing in the pick-off search coil 1 is of negligible value, due to the high impedance input of tube 36, and negligible torque between the search coil and pick-off stator can appear.

Figure 4 is a representative plot of search coil output in volts versus the angular deviation in degrees between the relatively rotatable pick-off members of a device such as that of Figures 1 and 2. The zero degree point is that at which the search coil is centered with reference to the center leg and at which the induced voltages cancel one another. Those net output voltages which appear on either side of the zero or null position, as shown by portions 37 and 38 of the plat, are of opposite phase and thus serve to actuate the differential relay in accordance with the phase of voltage output which appears at the high impedance input to the discriminator-amplifier. When torque motors which are additionally responsive to the magnitude of search coil output voltages are employed, the pick-off output is also satisfactory for control initiator purposes, since the output is substantially linear over at least a range of plus or minus 60 degrees of angular movement. By properly dimensioning the open end 13 of the center leg of the lamination stack, the useful angular range in which an output voltage change occurs may be extended or modified to assume desired characteristics.

It should be apparent that the present invention is susceptible of modification in numerous ways without departure from the scope or spirit thereof. By way of illustration, it is contemplated that either the search coil or laminated structures may be the stator or rotor of the combination, that the configurations thereof may be altered from those illustrated, and that the device may be utilized to generate characteristic output signals responsive to motions other than rotary. It may, in some applications, be desirable that the search coil be oriented such that it does not encircle the laminated core, and this arrangement permits 360 degrees of free relatively rotatable motion between the search coil and the flux generating structure to be obtained with only minor modification.

While particular embodiments of the subject invention have been shown and described herein, these are in the nature of description rather than limitation, and it will occur to those skilled in the art that various changes, modifications, and combinations may be made within the province of the appended claims and without departing either in spirit or in scope from this invention in its broader aspects.

What we claim as new and desire to secure by Letters Patent of the United States is:

1. A control initiator device for producing output signals characteristic of the deviation of relatively movable members from a predetermined orientation, comprising a core of magnetic material supported by one of said members, a pair of windings, each of said windings being positioned on a different portion of said core, means supplying said windings with alternating current excitation to produce flux flows in opposite directions in said core, means completing a low reluctance flux circuit for the flux generated in each of said core portions by each of said windings, said low reluctance means and said core portions being disposed with a short air gap therebetween, a search coil, non-magnetic means mounting said coil on the other of said members and positioning said coil such that it surrounds said core and intercepts said flux flows in said flux circuits in proportions dependent upon the relative positions of said members.

2. A control initiator device for producing output signals characteristic of the deviation of relatively movable members from a predetermined orientation, comprising a core of magnetic material supported by one of said members, said core having a window therein and a leg portion extending partially across said window, electrical winding means positioned on said core for producing flux flows through said leg and in opposite angular directions through the halves of said core on each side of said leg portion, means applying alternating current excitation to said winding means, a search coil, non-magnetic means mounting said coil on the other of said members and positioning said coil such that voltages are induced therein by said flux flows in proportions dependent upon the relative positions of said members.

3. A control initiator device as set forth in claim 2 further comprising an electrical signal amplifier having a high impedance input circuit and means coupling the output from said search coil to said high impedance input circuit.

4. A pick-off device for producing electrical signals characteristic of the deviation of relatively rotatable members from a predetermined orientation, comprising a core of magnetic material supported by one of said members, said core including a substantially annular portion and a center leg extending diametrically to within a short distance of said annular portion, electrical winding means positioned on said core for producing flux flows through said center leg and in opposite angular directions through the halves of said core annular portion, means applying alternating current excitation to said winding means, a search coil, non-magnetic means mounting said coil on the other of said members such that it intercepts said flux flows between said annular core portion and said center leg in proportions dependent upon the relative angular positions of said members.

5. A pick-off device as set forth in claim 4 wherein said winding means comprises two serially connected windings each wound opposite to the other on one of said halves of said annular core portion, and wherein said search coil surrounds said core portion.

6. In a gyro instrument having an inner gimbal structure including a gyro rotor and motive means therefor, a main gimbal pivotally supporting said inner gimbal structure about a minor axis, and an outer gimbal pivotally supporting said main gimbal about a major axis, a low torque control initiator arrangement for producing output signals characteristic of the deviation of two adjacent ones of said gimbals from a predetermined angular orientation, comprising a core of magnetic material supported by one of said two gimbals, said core including a substantially annular portion and a center leg extending substantially diametrically to within a short distance of said annular portion, electrical winding means positioned on said core for producing flux flows through said center leg and in opposite angular directions through the halves of said core annular portion, means applying alternating current excitation to said winding means, a search coil, non-magnetic means mounting said coil on the other of said two gimbals such that equal and opposite voltages are induced therein by said flux flows when said gimbals have said predetermined orientation and such that said coil has net voltages of one or the opposite phase produced therein when said gimbals deviate in one or the opposite angular direction from said predetermined orientation.

7. In a gyro instrument as set forth in claim 6, the low torque control initiator arrangement further comprising an electrical signal amplifier having a high impedance input circuit, means coupling the output of said coil with said high impedance input circuit, discriminator means responsive to the output of said amplifier for producing output signals characteristic of the phase of said coil output, means for applying torque between a pair of adjacent gimbals, and means responsive to said discriminator output for actuating said torque means to apply torques in one or the opposite angular direction.

JOHN E. LUNDBERG.
GEORGE A. WALLACE.

References Cited in the file of this patent
UNITED STATES PATENTS

| Number | Name | Date |
|--------|------|------|
| 1,136,566 | Usener | Apr. 20, 1915 |
| 2,393,473 | Jones | Jan. 22, 1946 |
| 2,484,022 | Esval | Oct. 11, 1949 |